United States Patent [19]

Buzga et al.

[11] 4,073,661
[45] Feb. 14, 1978

[54] PROCESS FOR CLEANING COMMINUTED PLASTIC MATERIAL

[75] Inventors: Heinrich Buzga, Grevenbroich; Werner Steprath, Dormagen; Kurt Pause, Bosau uber Eutin, all of Germany

[73] Assignee: Maschinenfabrik Buckau R. Wolf Aktiengesellschaft, Grevenbroich, Germany

[21] Appl. No.: 694,550

[22] Filed: June 10, 1976

[30] Foreign Application Priority Data

June 10, 1975 Germany ............................. 2525750
June 10, 1975 Germany ............................. 2525749

[51] Int. Cl.$^2$ .............................................. B08B 3/12
[52] U.S. Cl. ............................................ 134/1; 134/19; 134/25 R; 134/182; 134/183; 264/37
[58] Field of Search ................... 134/1, 19, 25 R, 33, 134/34, 60, 182, 183; 264/37, 233, DIG. 69; 210/33

[56] References Cited

U.S. PATENT DOCUMENTS

| 2,845,936 | 8/1958 | Boynton et al. | 134/25 R X |
| 3,222,221 | 12/1965 | Branson | 134/25 R X |
| 3,433,669 | 3/1969 | Kouril | 134/1 |
| 3,849,196 | 11/1974 | Halloway et al. | 134/25 R X |

Primary Examiner—S. Leon Bashore
Assistant Examiner—Marc L. Caroff
Attorney, Agent, or Firm—Michael J. Striker

[57] ABSTRACT

A continuous process for cleaning and preparing grossly soiled products of plastic material, such as sheets, bands, sacks or the like for subsequent re-use, in which the plastic material is comminuted after removing rough foreign objects therefrom, whereafter the comminuted plastic material is fed into a washing solution having a greater specific weight than the plastic material and subjected together with the washing solution in a washing zone to turbulence, transferred to a turbulence-free zone containing washing solution by passage under a submerged edge of a partition submerged in the washing solution and separating the washing zone from the turbulence—free zone, and thereafter subjected first to mechanical and then to a thermal drying operation.

10 Claims, 4 Drawing Figures

PROCESS FOR CLEANING COMMINUTED PLASTIC MATERIAL

BACKGROUND OF THE INVENTION

The present invention relates to a continuous process for cleaning and preparing grossly soiled products of plastic material, such as sheets, bands, sacks or the like for subsequent re-use of the plastic material, in which the plastic material after removing rough foreign objects therefrom is comminuted and fed into an extruder.

Such processes have become important in recent times, due to the increasing shortage and cost of raw materials as well as in consideration of the evironment, to prevent such plastic products after use of the same to form part of an ever increasing amount of garbage which has to be dumped or burned.

During the production of, for instance, sheets or bands of plastic material, there will result a certain percentage of clean dry scrap which, separated in accordance with its composition, may be comminuted and without further treatment fed into an extruder. Such scrap constitutes about 10% of the material necessary for producing the aforementioned or like products. 90% of the material is transformed into products for instance sheets or bands which are mainly used in the packaging industry. Plastic material used for the packaging industry are usually discarded after a relatively short time and such discarded plastic material are, at least partly, considerably soiled.

Attempts have already been made to clean and prepare such soiled products of plastic material which have been used for the same purpose, for instance as sacks for fertilizers, which accumulate after use in considerable amounts, in order to remove from such products foreign particles clinging thereto as for instance fertilizer particles, humus particles, sand, etc.

For this purpose it is known to free the solid products of plastic material from foreign particles, to subsequently comminute the products in a cutting mill and to feed them thereafter into a special regranulating extruder.

This known process has the disadvantage that fine grained foreign particles will cling, even after the comminuting of the plastic products to the latter and be thus fed with the comminuted plastic material into the extruder. This will result in clogging the sieves of the extruder as well as in an increased wear of the various parts thereof, and the necessity to exchange the clogged extruder sieves, which evidently will reduce the output of the extruder. In addition, very fine grained foreign particles will not be retained by the sieves of the extruder and thus be included in the end product produced so that such end product will be of inferior quality.

SUMMARY OF THE INVENTION

It is an object of the present invention to overcome the above disadvantages of known processes and to free even grossly soiled plastic products from fine grained foreign particles before the thus cleaned used products are fed into the extruder for further processing of the same.

With these and other objects in view, which will become apparent as the description proceeds, the present invention relates to a continuous method for preparing and cleaning grossly soiled products of plastic material for subsequent re-use, comprising the steps of comminuting the plastic material after removing rough foreign objects therefrom, feeding the comminuted plastic material into a washing solution having a greater specific weight than the plastic material, subjecting the washing solution and the comminuted plastic material therein in a washing zone to considerable turbulence, transferring the comminuted plastic material into a turbulence free zone located downstream of said washing zone, continuously moving the comminuted plastic material from the zone free of turbulence, and thereafter subjecting the wet comminuted plastic material first to mechanical pre-drying and subsequently to a thermal finish-drying operation.

The intensity of the turbulence may be regulated and the turbulence producing means may be arranged in such a manner that the turbulence in the washing zone decreases in downward direction so as to form at the bottom of the washing zone a zone of complete calmness. The cleaning process can be improved by the density of the comminuted plastic material subjected to turbulence, due to the resultant frictional contact between the comminuted parts, and the speed of which soluble foreign particles clinging to the comminuted plastic material are dissolved may be increased by subjecting the washing solution in the washing zone to sound waves and interference of such sound waves, whereby the frequency of the sound waves may be in the order of 100 Hz and the intensity thereof may be in the order of 80 decibles The soluble foreign particles are dissolved in the washing solution whereas the unsoluble foreign particles, which are heavier than the washing solution, sink at the lower border of the zone of turbulence out of the mass of particulated plastic material and can, depending on the accummulating amount, be drawn off in downward direction and removed from the washing solution. The washing apparatus can be constructed in such a manner that the density of the comminuted plastic material therein and the time in which the comminuted plastic material is maintained in the washing apparatus may be regulated in accordance with the speed at which soluble foreign particles are dissolved in the washing solution.

By providing an appropriate partition in the container of the washing apparatus for carrying out the present invention a turbulence free zone is created at one end of the container, into which the cleaned mass of comminuting plastic material will rise to be continuously removed therefrom. The mass of comminuted material can be removed over an inclined sieve and during this movement be sprayed with clean water and fed to a transporting blower which blows the dripping comminuted material into a known whirling sieve as for instance disclosed in DT-AS 1,226,096. In the whirling sieve the free water is separated so that the mass of particulated material will contain only a remaining water content of 1.5% of its weight. An air stream blows the comminuted material out of the whirling sieve whereby the air stream carries along water drops and fog. The comminuted plastic material, transported by the air stream, is deflected in centripetal direction in a sieve cylinder whereby most of the water finely distributed in the air stream passes through the cylindrical wall of the sieve and is intercepted by continuous wall surrounding the sieve cylinder spaced therefrom, condensed thereon and discharged.

The comminuted plastic material is discharged downwardly through a conical end of the sieve cylinder and is further transported by an air stream extending transverse thereto and produced by further blower. This further blower sucks air through a preheater in which the air is heated up to a desired temperature by electrical heating means, or by a heat exchanger heated with hot steam, or by mixing with heating gases. The remaining moisture of the comminuted plastic material is absorbed in the hot air stream. The mass of comminuted material is separated in a cyclone in a known manner from the air and the comminuted material drops, with a remaining moisture content smaller than 0.05% of the weight of the mass, into an intermediate container from which it is transmitted in a known manner without further treatment or drying into an extruder.

The mass of particulated plastic material is melted in a known manner in the extruder and discharged therefrom. The discharged material may be in granulated form or be blown into tubes, or discharged through a nozzle having an elongated slot and formed by further calendering into sheets of plastic material.

Apparatus in which flat pieces of scrap of plastic material are moved around in a washing solution for separating foreign particles therefrom are known.

For instance an apparatus is known into which such scrap in form of rather large irregular pieces is fed and moved around in the washing solution by fast rotating members to be thereby torn into smaller pieces. Soluble foreign particles and unsoluble very fine grained foreign particles are thereby transmitted to the washing solution. The container of this known washing apparatus has a sieve basket in which comminuting and stirring parts of the apparatus rotate. The washing solution is discharged at the end of the washing process and the rotating elements tear, squeeze and rub the particulated plastic material further and to produce thereby heat by friction. The thus created heat will plasticize the comminuted plastic particles and evaporate the remaining washing solution. It is also possible to rinse the comminuted plastic particles with fresh water after the washing process and to evaporate the remaining water by the aforementioned heat created by friction.

This known device has considerable disadvantages. The sieve basket lets only soluble and very fine grained unsoluble foreign particles pass therethrough. Sand or even larger foreign particles are retained within the basket together with the comminuted plastic particles. Since the comminuted plastic particles are heated to such an extent to render the same into plastic condition, such sand particles or larger particles are welded together with the comminuted particles of plastic material and remain therefore in the cleaned material. This causes clogging of the sieve in the extruder in the subsequent extruding process and practice has shown that the sieves sometimes remain thus in proper working condition only for about ten minutes.

It is further known that producing of heat by friction is very uneconomical since only that portion of the expended energy is transformed into heat which corresponds to the friction coefficient. As know, 540 kcal are necessary to evaporate one kilogram of water at atomspheric pressure while according to the mechanical heat equivalent 427 mkp mechanical energy is necessary for the production of one kcal. Therefore the output of cleaned comminuting particles of this known apparatus is small relative to the necessary large energy.

This known apparatus has further the disadvantage that it can be operated only in batches, that is intermittently, while requiring considerable manual labor.

It is thus a futher object of the present invention to provide a washing apparatus for carrying out part of the above mentioned process which avoids the disadvantages of such washing apparatus known in the art, which can be continuously operated without requiring manual labor, in which soluble foreign particles clinging to the plastic material are properly dissolved in a washing solution which is maintained at a constant concentration and from which the unsoluble foreign particles may be removed by sedimentation, in which the speed of solution of slowly soluble foregin material can be increased and which requires a relatively small amount of energy for its operation.

The washing apparatus according to the present invention mainly comprises an elongated container having at least one downwardly extending funnel shaped portion closed by a valve, means for feeding soiled comminuted plastic material in the region of one end wall into the container, means for maintaining in the container a bath of washing solution of a specific weight greater than that of the comminuted plastic material fed thereinto, a partition adjacent the other end wall of the container extending into the bath of washing solution and dividing the interior of the container into a washing zone and a discharge zone adapted to communicate with each other, means for agitating the washing solution and the comminuted plastic material in the washing zone, and means for removing the comminuted and cleaned plastic material from the discharge zone. The means for agitating preferably comprise two parallel shafts extending in horizontal direction through the washing zone and having axes in the region of the level of the bath of washing solution in the container, a plurality of adjacent substantially radially extending paddles on each shaft, and means for driving the shafts so that the paddles located at any instance above a horizontal plane including the axes of said shafts move toward each other.

The washing solution and therewith the comminuted plastic material introduced at one end wall of the elongated container are moved in the latter by the rotating shafts and the paddles projecting therefrom. Due to the opposite rotation of the two shafts, the comminuted particles are drawn from the region of the longitudinal side walls of the container toward the center thereof, pushed downwardly at the center and whirled around. According to the physical principles of the smallest mutual hindrance, the comminuted particles are quickly distributed over the whole length of the container so that they are also moved in the longitudinal direction of the container. The density of the whirling particles is substantially equal in horizontally extending layers, but diminishes from layer to layer in downward direction. The comminuted particles fed into the elongated container in the region of one of the end walls travel towards the opposite end wall, which is separated from the remainder of the container by a partition. The sunk particles still maintained in turbulence travel beneath the bottom edge of the partition into a discharge zone where they are not subjected to turbulence and rise in the latter to the surface of the bath in the container, from where they are discharged by a discharging device.

Since a predetermined washing time necessary, the elongated container has the advantage that the time the particles will take to pass through the elongation of the container may be properly adapted to the continuous washing process. If the transverse cross-section of the container is oval, then such a form may be properly adapted to the movement of the shafts and the paddles connected thereto so as to obtain an advantageous movement of the washing solution in the container. Advantageously, the shafts are arranged closely below the upper level of the bath of the washing solution in the container so that the paddles will dip into the washing solution only during twothirds of its circular movement. Preferably, the paddles are mounted on the respective shafts so that the included angle between the paddles and the shaft axis may be adjusted to thereby provide in the washing solution in addition to the stirring action also a movement in the longitudinal direction of the container. If the paddles extend substantially normal to the shaft axes, then the paddles will stir the contents of the container uniformly to thereby assure a uniform distribution of the comminuted particles in the longitudinal direction of the container. On the other hand, the paddles may be adjusted in such a manner to produce a flow component towards the end wall of the container at which the comminuted particles are introduced into the same so that the density of the comminuted particles would be greatest at this end wall and gradually diminish in the direction towards the partition. The paddles may also be adjusted in the opposite direction to produce a flow component towards the partition so that the density of the comminuted particles increases in the direction towards the partition.

The number of revolutions per minute of the shafts is preferably adjustable and is adjusted depending on the size and thickness of the comminuted plastic material so that the comminuted particles are only driven downwardly in the container toward the portion of the latter which is joined by a funnel shaped bottom portion. During such operation soluble foreign particles clinging to the comminuted plastic material are dissolved in the washing solution, rough foreign particles are first driven in downward direction to pass thereby into the calm zone of the funne-shaped bottom portion of the container, and sink downwardly into the latter.

The aforementioned partition is preferably adjustable in vertical direction so that the opening at which the washing zone communicates with the discharge zone can be adjusted in size to therewith adjust the time during which the comminuted particles remain in the washing zone in any desired manner. The necessary time at which comminuted particles have to remain in the washing zone is determined by the degree of soiling of the comminuted particles and the speed at which soluble foreign particles clinging to the comminuted plastic particles may be dissolved in the washing solution. The speed of dissolving such dissolvable particles can be increased by subjecting the washing solution to sound waves.

By adjusting the number of revolutions per minute of the shafts, by further adjusting the position of the paddles relative to the shaft axes and adjusting the position of the partition in vertical direction, the time at which the comminuted particles will remain in the washing solution and the rate of travel of the comminuted particles through the container may thus be adjusted in any desired manner.

In the region between the container and the downwardly extending funnel-shaped portion thereof, there is provided over the whole bottom face of the washing zone a grate at which the turbulence maintained in the washing zone is broken. The washing solution below the grate is calm so that insoluble foreign particles will settle and concentrate at the lower end of the funnel-shaped bottom portion of the container. In order to observe such accummulation, two opposite view glasses are provided in the funnel-shaped portion and a manually operated valve is provided at the lower end thereof to discharge the accumulated foreign particles in necessary time intervals.

The means for withdrawing the cleaned comminuted particles from the discharge zone may be constructed in various different ways. According to the present invention the discharge means comprise endless chain means and a plurality of transverse sheet metal members projecting uniformly spaced from each other from the endless chains, whereby the transverse sheet metal members dip in a direction transverse to the longitudinal direction of the container in the washing solution and move the particulated plastic material out of the turbulence free zone behind the partition over an inclined surface to a discharge chute.

The chain means is guided in the upper region of the discharge zone over sprocket wheels and rollers in rails of U-shaped cross-section. The chain means are guided in such a manner that the transverse sheet metal members dip in direction transverse to the longitudinal direction of the container into the washing solution while being guided for a part of its path in substantially horizontal direction through the washing solution and subsequently thereto be guided over an upwardly inclined surface. This upwardly inclined surface is preferably constiuted by a sieve. The inclined sieve dips at its lower edge beneath the upper surface of the washing solution. A trough inclined corresponding to the inclination of the sieve is arranged beneath the same so that the washing solution dropping through the sieve is returned by the trough into the container. At the upper end of the inclined sieve the washed comminuted particles are dripping wet dropped onto a chute. A plurality of nozzles are preferably arranged above the inclined portion of the chain means spaced from each other in a direction transverse to the elongation of the container and conduit means for feeding fresh water to the nozzles are provided so that the comminuted particles passing upwardly along the inclined sieve are sprayed with fresh water, which passes through the sieve into the trough to be returned into the container to thus compensate for the loss of washing solution taken along with the particles. In any case it is necessary to feed fresh water in the container to replace losses of the washing solution. According to the invention, the fresh water is supplied at such a location that it serves at the same time for further cleaning the comminuted material. The washing solution has to have a specified weight which is greater than the comminuted material to be treated. If the comminuted material is polyethylene or polypropylene, water may be used as a washing solution. If the plastic material is constituted by polyamides the specific weight of the washing solution may be increased by addition of salts. Traces of such salts clinging to the comminuted particles will be removed therefrom by the fresh water sprayed through the nozzles on the comminuted particles as they are moved upwardly along the inclined sieve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
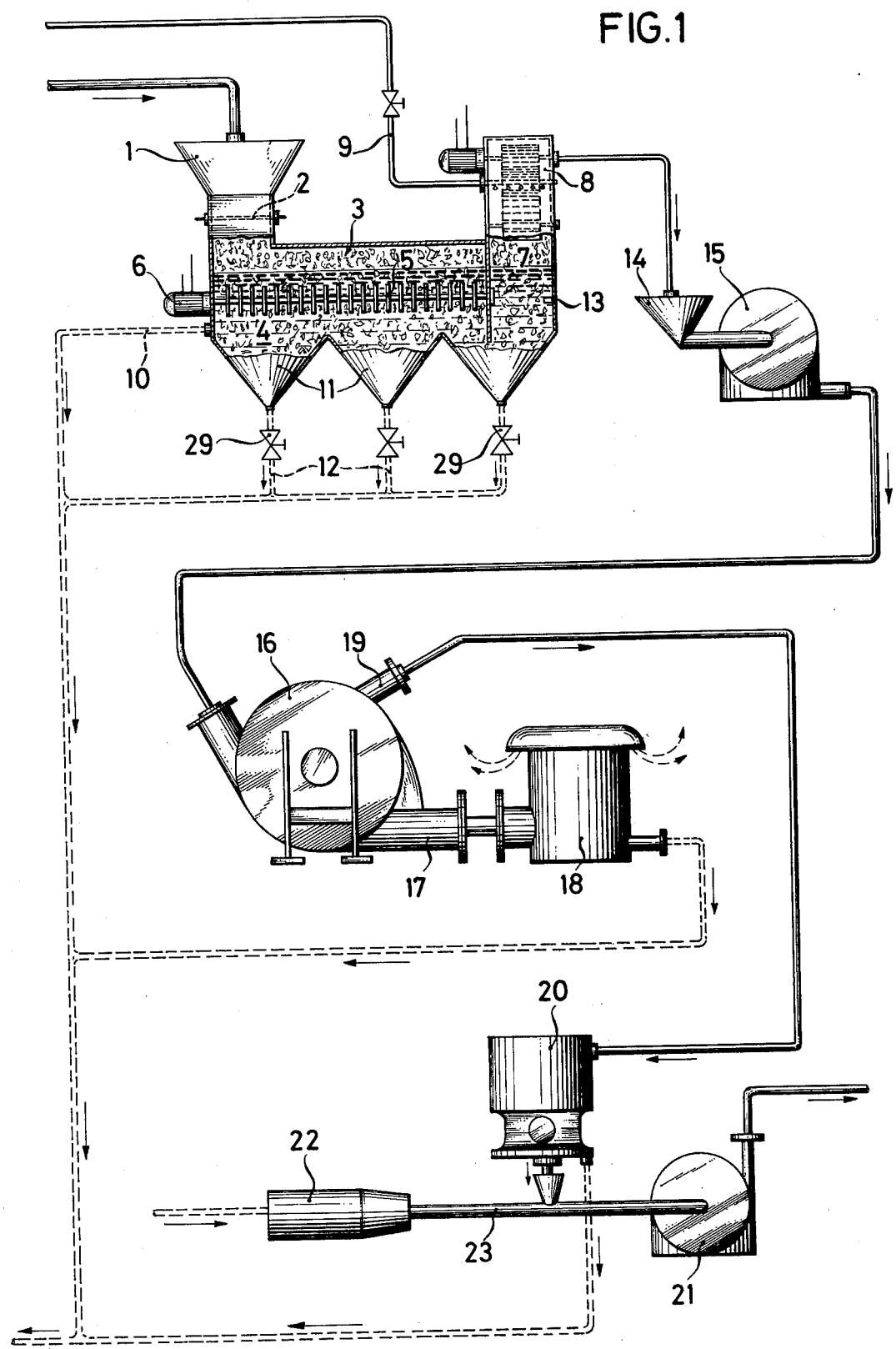
FIG. 1 is a schematic illustration of an arrangement for carrying out the process according to the invention.

FIG. 1 schematically illustrates an arrangement for carrying out the method according to the present invention whereby known elements for removing rough foreign objects such as metal parts, glass parts and stones and for communicating the plastic material are omitted for simplification reasons.

Grossly soiled products of plastic material, such as sheets, bands, sacks or the like, are comminuted in a non-illustrated cutting mill to a desired particle size and fed into a tank 1. The mass of comminuted particles are continuously fed through a dosing device 2 into a washing apparatus 3 and pass in a predetermined time through a zone of turbulence 4 in the washing apparatus, which is produced by a stirring device 5 driven by a motor 6, which drives the comminuted particles into a turbulence free zone 7 downstream of the washing zone 4 to the upper surface of a washing solution maintained in the washing device 3. The comminuted particles are continuously discharged from the zone 7 by a discharging device, for instance an endless chain 8 provided with uniformly spaced transverse bars which push the comminuted particles along the upper surface of an inclined sieve and lift the particles in this way out of the washing solution.

As the particulated mass of plastic material moves over the inclined sieve, it passes beneath a spraying zone, supplied with fresh water through a conduit 9, to be flushed with clean water. Cleaning solution taken along by the mass of particulated material and the flushing water flow back into the washing container 3. The flushing water replenishes with a certain surplus the water carried along by the mass of particulated material. An overflow 10 communicating with the interior of the washing container is provided, through which an excess of water flows out of the container 3, so that the level of cleaning solution in the container remains constant. The foreign particles freed from the particulated mass of plastic material collect in the funnel-shaped bottom portions 11 of the container 3 and are discharged therefrom intermittently through the conduits 12.

A pH measuring device 13 communicating with the interior of the container 3 serves to measure the concentration of the washing solution, and the concentration thereof is kept substantially constant by adding appropriate material to the washing solution, whenever the concentration thereof falls below a desired minimum value.

The wet mass of particulated plastic material falls through a chute 14 into the suction opening of a blower 15 to be blown by the latter into a centrifugal sieve 16 of known construction. The water separated from the mass of particulated material is discharged through the socket 17 of the centrifugal sieve 16 into an air separator 18, whereas the predried mass of particulated material is discharged through the socket 19. The mist surrounding the particulated material is separated therefrom in a sieve separator 20 from which the mass of particulated material is discharged in downward direction. The downwardly falling mass of particulated material is engaged by a transverse air stream produced by a transporting blower 21 and the remaining moisture clinging to the surface of the mass of particulated material is removed by evaporation in the air stream heated by the heater 22. The conduit 23 through which the mass of particulated material is tranported by the heated air stream is chosen long enough so as to assure a complete evaporation of any remaining moisture and the particulated mass of plastic material leaving the conduit 23 is dried to such an extent that its melting in an extruder can be carried out without further treatment. Air is separated from the particulated mass of dried plastic material in a further non-illustrated cyclone and the mass of dried particulated material is transmitted into a container, from which it is continuously transported into a likewise not illustrated extruder.

Figure 2:
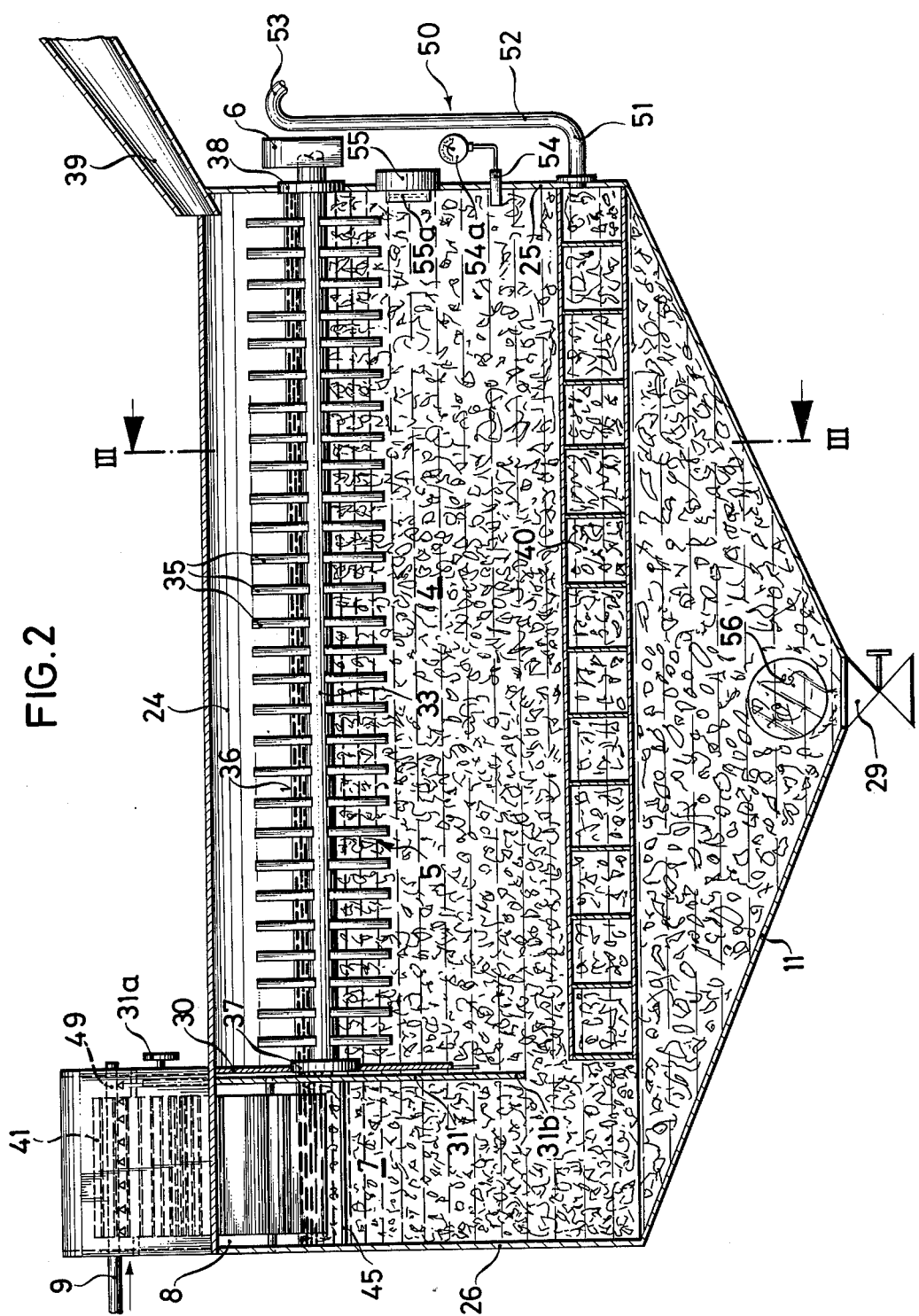
FIG. 2 is a longitudinal cross-section through the washing apparatus used in the process, this cross-section being taken along the lines II—II of FIG. 3.
Figure 3:
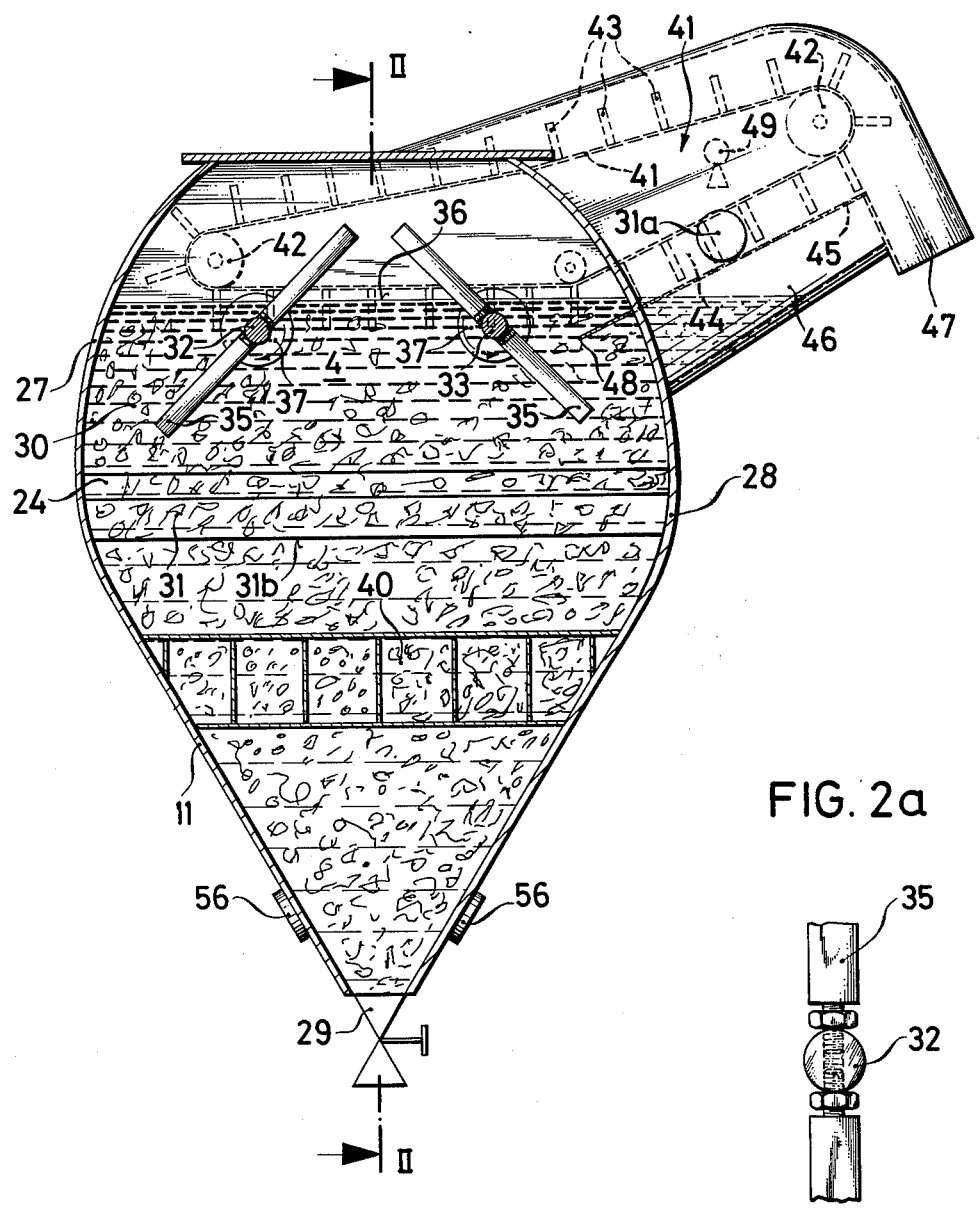
FIG. 3 is a cross-section taken along the line III—III of FIG. 2.
Figure 2A:
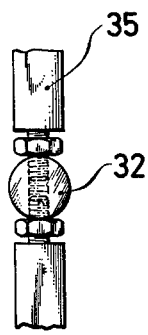
FIG. 2a is a detail of FIG. 3.

FIGS. 2 and 3 illustrate the washing apparatus 3 only schematically shown in FIG. 1 in further detail. As shown in these Figures, the washing apparatus 3 comprises an elongated container 24 having end walls 25 and 26 and side walls 27 and 28. The upper end of the container 24 may be open or closed. The container 24 has at least one or a plurality of downwardly extending funnel-shaped extensions 11, which at the bottom ends thereof are closed by manually operable valves 29. A separating wall 30 is provided spaced from the end wall 26 of the container to divide the latter in a washing zone and a shorter discharging zone 7. The discharging zone 7 has a length which is about 1/6th of the total length of the container 24. A vertically adjustable partition 31 is mounted on the stationary separating wall 30 and the lower edge 31b of the partition can be moved downwardly by manually operable means 31a of known construction, not forming part of the present invention up to the junction of the funnel-shaped extension 11 with the remainder of the container. Two parallel horizontally extending shafts 32 and 33 extend between the separating wall 30 and the end wall 25, with the axes of the shafts located a small distance below the upper level 36 of the washing solution in the container 24. The shafts 32 and 33 are turnably mounted in bearing 37 and 38 respectively provided in the end wall 25 and the separating wall 30. Each of the shafts is provided with a plurality of paddles 35 projecting spaced from each other in longitudinal direction of the shafts in substantially radial direction therefrom. The paddles 35 are preferably mounted on shafts 32 and 33 adjustable about an axis normal to the respective shaft axis, as shown in FIG. 2a. The drive 6 for the shafts 32 and 33 is arranged outside the container 24 in the region of the end wall 25 and constructed in such a manner that the shafts 32 and 33 may be driven at adjustable speeds with the direction of turning of the shafts as indicated by the arrows in FIG. 3, so that the paddles, located at any instance above a horizontal plane including the axes of the shafts, move toward each other. A chute 39 is provided in the region of the end wall 25 for feeding soiled comminuted particles of plastic material into the latter.

A wide meshed grate 40 is provided above the junction of the funnel-shaped end portions 11 with the remainder of the container 24 and this grate extends over the total bottom face of the washing zone 4 in the container.

The means 8 for removing the particulated mass of plastic material from the discharge zone 7 comprises endless chain means 41 from which a plurality of transverse endless chain means 41 from which a plurality of transverse sheet metal members 43 project spaced from each other. The endless chain means is guided over a plurality of rollers 42 in a direction transverse to the longitudinal direction of the container 24, with one portion of the endless chain 41 extending in horizontal direction slightly above the level 36 of the washing solution in the container so that the transverse sheet metal members 43 thereon dip into the washing solution, whereas another portion of the endless chain means 41 extends upwardly from the horizontal portion thereof and the free ends of the transverse sheet metal members 43 on this upwardly extending portion of the chain means move closely adjacent a correspondingly upwardly inclined sieve 45 underneath which a trough 46 is arranged. The horizontally extending portion of the chain means extends about up to the lower edge 48 of the sieve 45 and extends upwardly inclined therefrom. A chute 47 extends downwardly inclined from the upper edge of the sieve 45. As the transverse sheet metal members move along the upwardly inclined sieve 45 they transport the particulated material, floating adjacent the upper level 36 of the washing solution in the discharge zone 7, upwardly along the sieve 45 and take part of the washing solution along.

This loss of the washing solution must be replenished. For this purpose a conduit 9 feeding fresh water is provided extending with an end portion thereof above the upwardly inclined portion of the endless chain means and the conduit 9 is provided in this end portion with a plurality of nozzles 49 to spray the fresh water over the particulated material moving along the inclined sieve 45, and this fresh water, which is used as rinsing water for the pre-cleaned mass of particulated material, flows through the trough 46 into the container 24. An overflow conduit 50 having an inlet 51 in the region of the grate 40 in the end wall 25 extends from the inlet with a portion 52 in upward direction and has a curved outlet 53 at its upper end so as to maintain the level 36 of the washing solution in the container 24 constant.

A measuring device 54 is provided at the end wall 25 for measuring the pH value of the washing solution and this measuring device is preferably connected to an indicating instrument, not shown in the drawing. Preferably, a sound wave generator 55 is also mounted on the end wall 25 and the membrane of the sound wave generator is excited with an alternating current of a frequency of 50 Hz. The intensity of the sound waves is in the order of 80 decibles. The sound wave generator 55 may produce sound waves with a frequency of 100 Hz which passes through the cleaning solution and are reflected by the curved side walls 27 and 28 of the container 24 to thus interfere with each other and to increase their action. The reflection of the sound waves is not only controlled by the oval cross-section of the container 24, but also by the material from which these walls are formed. This material has to have a great module of elasticity and the surface of the walls is made inductive by a layer of enamel provided thereon. The speed at which soluble impurities are dissolved is increased by the sound waves and a further increase may be derived by feeding heated fresh water through the conduit 9 or by heating the washing solution in the container 24.

Two inspection glasses 56 are provided in opposite walls of the funnel-shaped extension, or extensions, 11 for observing the accumulation of undissolved impurities in these funnel-shaped extensions.

The above-described washing apparatus will be operated as follows:

The particulation of the scrap of plastic material is carried out in a cutting mill which requires considerably less energy than is necessary for tearing and squeezing such scrap according to the known process.

At the start of the washing operation the partition 31 is lowered to the maximum degree so that the turbulence free discharging zone 7 is substantially separated from the washing zone 4. Subsequently thereto a great mass of particulated plastic material is introduced through the chute 39 into the washing zone 4, whereafter the two shafts 32 and 33 with the paddles 35 thereon are rotated in the aforementioned direction. The particulated mass of plastic material is mechanically agitated by the closely arranged paddles on the shafts 32 and 33. Since the partition 31 is lowered the particulated mass of plastic material cannot immediately pass into the region of the discharge zone 7. After a predetermined time period the partition 31 is lifted to a certain extent and additional particulated material is fed through the chute 39 into the container 24. The whirling mass of particulated material in the washing zone 4 passes now gradually beneath the lower edge 31b of the partition into the discharge zone 7 and spreads transversely in the latter. The particulated mass in the discharge zone 7 floats to the upper surface of the washing solution therein and is engaged by the transverse sheet metal members 43 on the chain means 41 which move the mass continuously over the inclined sieve 45. As the particulated mass leaves the washing solution, the portion of the washing solution carried along with the moving mass passes through the sieve 45 and flows over the inclined trough 46 back into the container 24. Subsequently the mass of particulated material on the sieve 45 passes bebeneath the nozzles 49 and is sprayed and flushed by the fresh water passing through the nozzles. The fresh water passes also through the sieve 45 and flows back into the container 24. The mass of particulated material reaching the upper edge of the sieve 45 falls into the chute 47, and is further transported and treated in the manner as described in connection with FIG. 1.

After the partition is moved to its final position at the end of the starting period of the washing process, this washing process proceeds continuously without requiring any manual labor.

It will be understood that each of the elements described above, or two or more together, may also find a useful application in other types of apparatus for preparing and cleaning grossly soiled products of plastic material for subsequent re-use differing from the types described above.

While the invention has been ilustrated and described as embodied in an apparatus for preparing and cleaning grossly soiled products of plastic material for subsequent re-use, it is not intended to be limited to the details shown, since various modifications and structural changes may be made without departing in any way from the spirit of the present invention.

Without further analysis, the foregoing will so fully reveal the gist of the present invention that others can, be applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A continuous method for preparing and cleaning grossly soiled products of plastic material, such as sheets, bands, sacks or the like for subsequent re-use, comprising the steps of comminuting the plastic material after removing rough foreign objects therefrom; feeding the comminuted plastic material into a washing solution having a greater specific weight than the plastic material; subjecting the washing solution and the comminuted plastic material therein in a washing zone to turbulence; advancing the comminuted plastic material into a turbulence-free zone containing washing solution and located downstream of the washing zone by transferring the plastic material under a submerged edge of a partition which is submerged in the washing solution and separates the washing zone from the turbulence-free zone; continuously removing the comminuted plastic material from the turbulence-free zone; and thereafter mechanically pre-drying and subsequently thermally finish drying the comminuted plastic material.

2. A method as defined in claim 1, and including the steps of regulating the intensity of turbulence in the washing zone.

3. A method as defined in claim 1, wherein the turbulence in said washing zone decreases in downward direction so as to form at the bottom of the washing zone a zone of calm.

4. A method as defined in claim 1, and including the step of increasing speed of solution of soluble foreign material clinging to the comminuted plastic material by subjecting the washing solution in the washing zone to sound waves and interference of said sound waves.

5. A method as defined in claim 4, wherein the frequency of the sound waves is in the order of 100 Hz and the intensity thereof in the order of 80 decibles.

6. A method as defined in claim 1, and including the step of rinsing the comminuted plastic material with clear water after removal of the comminuted plastic material from the washing solution.

7. A method as defined in claim 1, and including the step of draining the comminuted plastic material before subjecting the plastic material to the mechanical pre-drying operation.

8. A method as defined in claim 1, wherein the wet comminuted plastic material removed from the turbulence-free zone is blown by an air stream into a mechanical drying apparatus which performs the mechanical pre-drying operation.

9. A method as defined in claim 1 including the step of separating mist from the comminuted plastic material in a sieve separator between the mechanical pre-drying and the thermal finish drying operations.

10. A method as defined in claim 9, wherein the comminuted plastic material is discharged in downward direction from the sieve separator and entrained by a stream of hot air travelling in substantially horizontal direction and effecting said thermal finish drying operation.

* * * * *